(12) United States Patent
Patel et al.

(10) Patent No.: US 10,521,380 B1
(45) Date of Patent: Dec. 31, 2019

(54) USING STORAGE CONTROLLERS TO RESPOND TO MULTIPATH INPUT/OUTPUT REQUESTS

(71) Applicant: International Business Machines Corporation, Armonk, NY (US)

(72) Inventors: Sarvesh S. Patel, Pune (IN); Subhojit Roy, Pune (IN); Kushal S. Patel, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/006,705

(22) Filed: Jun. 12, 2018

(51) Int. Cl.
*G06F 13/38* (2006.01)
*G06F 13/366* (2006.01)
*G06F 13/42* (2006.01)

(52) U.S. Cl.
CPC ........ *G06F 13/366* (2013.01); *G06F 13/4204* (2013.01); *G06F 2213/3604* (2013.01)

(58) Field of Classification Search
CPC .............. G06F 13/366; G06F 13/4204; G06F 2213/3604
See application file for complete search history.

(56) References Cited

U.S. PATENT DOCUMENTS

| | | | | |
|---|---|---|---|---|
| 8,918,537 B1* | 12/2014 | Sandstrom | .......... | H04L 12/6418 709/223 |
| 9,720,601 B2* | 8/2017 | Gupta | .................. | G06F 3/0611 |
| 2007/0124407 A1* | 5/2007 | Weber | ................... | G06F 3/0607 709/212 |
| 2007/0248017 A1* | 10/2007 | Hinata | .................... | G06F 3/061 370/238 |
| 2013/0265877 A1* | 10/2013 | Baker | ................... | H04L 47/125 370/235 |
| 2013/0311719 A1 | 11/2013 | Doedline, Jr. et al. | | |
| 2013/0318297 A1* | 11/2013 | Jibbe | ....................... | G06F 3/061 711/114 |
| 2014/0229638 A1* | 8/2014 | Zhou | ....................... | G06F 3/061 710/38 |

(Continued)

FOREIGN PATENT DOCUMENTS

EP 3247077 A1 11/2017

*Primary Examiner* — Jing-Yih Shyu
(74) *Attorney, Agent, or Firm* — Zilka-Kotab, P.C.

(57) ABSTRACT

A computer program product, according to one embodiment, includes a computer readable storage medium having program instructions embodied therewith. The computer readable storage medium is not a transitory signal per se. Moreover, the program instructions are readable and/or executable by a controller to cause the controller to perform a method which includes: receiving a same input/output request along more than one communication paths, and evaluating a workload associated with each of the communication paths. A communication path having a lowest workload associated therewith is selected. Moreover, information corresponding to the input/output request as well as a status are sent along the selected communication path. The status sent indicates that the selected communication path was chosen to satisfy the input/output request. A special status indicating that none of the remaining communication paths were chosen to satisfy the input/output request is also sent along each of the remaining communication paths.

20 Claims, 8 Drawing Sheets

(56) References Cited

U.S. PATENT DOCUMENTS

| | | | |
|---|---|---|---|
| 2014/0259212 A1* | 9/2014 | Plesch | C12N 15/8243 800/278 |
| 2015/0269099 A1* | 9/2015 | Kawano | G06F 13/18 710/316 |
| 2018/0285159 A1* | 10/2018 | Shen | G06F 9/3836 |

* cited by examiner

US 10,521,380 B1

USING STORAGE CONTROLLERS TO RESPOND TO MULTIPATH INPUT/OUTPUT REQUESTS

BACKGROUND

The present invention relates to storage systems, and more specifically, this invention relates to storage systems which utilize storage controllers to respond to multipath input/output (I/O) requests.

Data storage systems are used to satisfy I/O requests which correspond to a number of different hosts (e.g., users). Accordingly, data storage systems often implement storage architectures which connect storage components to the various hosts. As I/O requests are received from the hosts, storage controllers may be used to process the requests such that read and/or write operations are actually performed at one or more of the storage components.

Multipathing is a technique which defines more than one communication path between two given locations in a storage system. For instance, multipathing is implemented by some servers to access a single logical unit number (LUN), virtual disk, volume, etc., using multiple fabric paths. Doing so helps improve fault tolerance by ensuring that the failure of a single fabric path does not render the LUN totally inaccessible.

Conventional multipath implementations drive path selection from the host location. For example, when a path fails, the I/O request is reattempted using a different path selected by a multipath driver at the host location. Similarly, I/O request attempts may be orchestrated by a host multipath driver and sent to the storage controller of a storage system in a round robin fashion in an attempt to improve bandwidth.

However, these conventional multipath implementations experience significant problems when attempting to respond to failed I/O requests. For instance, because path selection is performed by the host multipath driver, the path selection is performed without being aware of current fabric conditions and/or conditions of storage controllers. As a result, congestions in the fabric of the storage system is unknown to the host multipath driver until after an I/O request times out or I/O response times are prolonged. It follows that conventional multipath implementations are forced to guess as to which connections are best suited to accomplish a given I/O request.

SUMMARY

A computer program product, according to one embodiment, includes a computer readable storage medium having program instructions embodied therewith. The computer readable storage medium is not a transitory signal per se. Moreover, the program instructions are readable and/or executable by a controller to cause the controller to perform a method which includes: receiving, by the controller, a same input/output request along more than one different communication paths; and evaluating, by the controller, a workload associated with each of the communication paths. Each of the communication paths connect a host to the controller. One of the communication paths having a lowest workload associated therewith is selected by the controller. Moreover, information corresponding to the input/output request as well as a status are sent, by the controller, along the selected communication path. The status sent indicates that the selected communication path was chosen to satisfy the input/output request. A special status is also sent, by the controller, along each of the remaining communication paths. The special status indicates that none of the remaining communication paths were chosen to satisfy the input/output request.

A computer program product, according to another embodiment, includes a computer readable storage medium having program instructions embodied therewith. The computer readable storage medium is not a transitory signal per se. Moreover, the program instructions readable and/or executable by a first controller to cause the first controller to perform a method which includes: receiving, by the first controller, an input/output request along a designated communication path. The designated communication path connects a host to the first controller. At least a second communication path also connects the host to the first controller. Moreover, the first controller is in communication with a second controller, the second controller being connected to the host by at least a third communication path and a fourth communication path. A workload associated with each of the communication paths connecting the host to a respective one of the first and second controllers is evaluated by the first controller. One of the communication paths having a lowest workload associated therewith is selected by the first controller. Moreover, the first controller determines whether the selected communication path connects the host to the first controller. In response to determining that the selected communication path connects the host to the first controller, the first controller determines whether the selected communication path is the designated communication path. In response to determining that the selected communication path is not the designated communication path, the first controller sends a special status along the designated communication path, the special status indicating that the designated communication path was not chosen to satisfy the input/output request. Furthermore, information corresponding to the input/output request as well as a status is sent by the first controller along the selected communication path, the status indicating that the selected communication path was chosen to satisfy the input/output request.

A controller-implemented method, according to yet another embodiment, includes: receiving an input/output request along a designated communication path. The designated communication path connects a host to the controller, while at least a second communication path also connects the host to the controller. The controller is additionally in communication with a second controller, the second controller being connected to the host by at least a third communication path and a fourth communication path. A workload associated with each of the communication paths connecting the host to a respective one of the controller and the second controller is evaluated, and one of the communication paths having a lowest workload associated therewith is selected. A determination is made as to whether the selected communication path connects the host to the controller. In response to determining that the selected communication path connects the host to the controller, another determination is made as to whether the selected communication path is the designated communication path. In response to determining that the selected communication path is not the designated communication path, a special status is sent along the designated communication path, the special status indicating that the designated communication path was not chosen to satisfy the input/output request. Moreover, information corresponding to the input/output request as well as a status is sent along the selected communication path. The status indicates that the selected communication path was chosen to satisfy the input/output request.

Other aspects and embodiments of the present invention will become apparent from the following detailed description, which, when taken in conjunction with the drawings, illustrate by way of example the principles of the invention.

DETAILED DESCRIPTION

Figure 1:
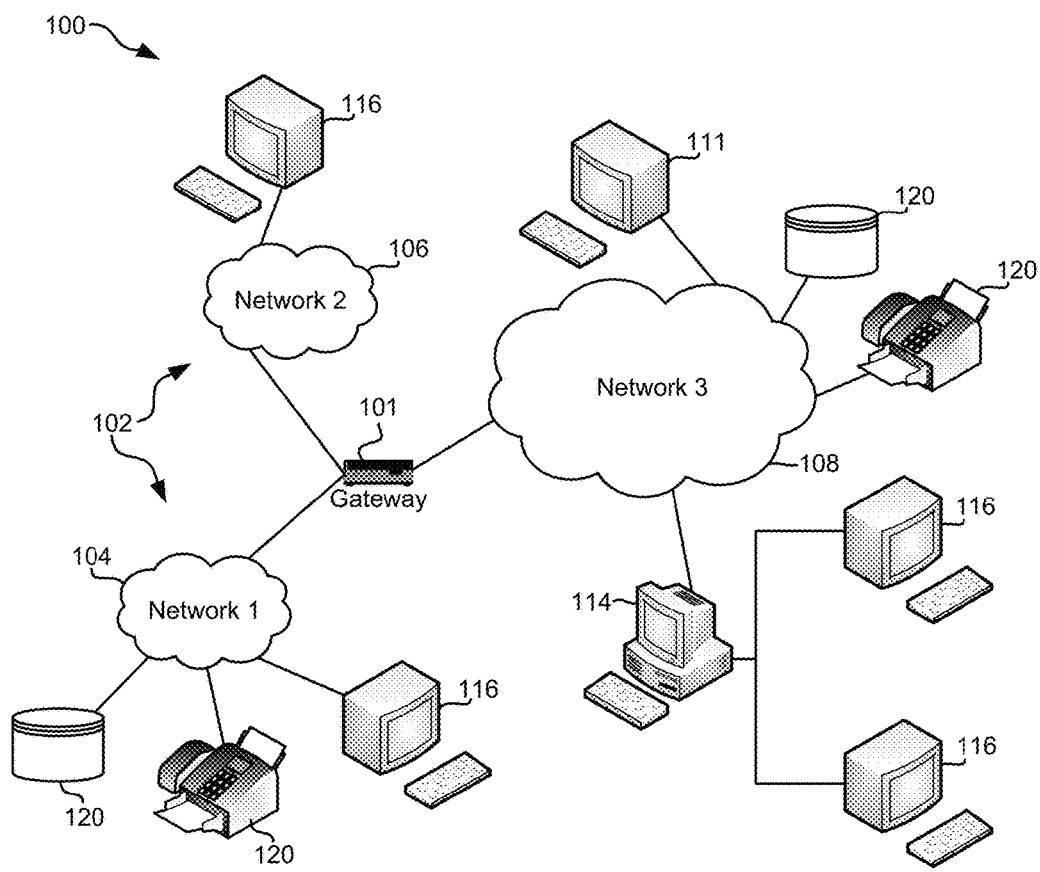
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products which are able to select a communication path to use for a given I/O request based on a detailed understanding of each of the communication paths which are available. As a result, some of the embodiments included herein are able to achieve improved bandwidth while also maintaining an improved fault tolerance by ensuring that the failure of one or more fabric paths does not result in a failed I/O request, e.g., as will be described in further detail below.

In one general embodiment, a computer program product includes a computer readable storage medium having program instructions embodied therewith. The computer readable storage medium is not a transitory signal per se. Moreover, the program instructions are readable and/or executable by a controller to cause the controller to perform a method which includes: receiving, by the controller, a same input/output request along more than one different communication paths; and evaluating, by the controller, a workload associated with each of the communication paths. Each of the communication paths connect a host to the controller. One of the communication paths having a lowest workload associated therewith is selected by the controller. Moreover, information corresponding to the input/output request as well as a status are sent, by the controller, along the selected communication path. The status sent indicates that the selected communication path was chosen to satisfy the input/output request. A special status is also sent, by the controller, along each of the remaining communication paths. The special status indicates that none of the remaining communication paths were chosen to satisfy the input/output request.

In another general embodiment, a computer program product includes a computer readable storage medium having program instructions embodied therewith. The computer readable storage medium is not a transitory signal per se. Moreover, the program instructions readable and/or executable by a first controller to cause the first controller to perform a method which includes: receiving, by the first controller, an input/output request along a designated communication path. The designated communication path connects a host to the first controller. At least a second communication path also connects the host to the first controller. Moreover, the first controller is in communication with a second controller, the second controller being connected to the host by at least a third communication path and a fourth communication path. A workload associated with each of the communication paths connecting the host to a respective one of the first and second controllers is evaluated by the first controller. One of the communication paths having a lowest workload associated therewith is selected by the first controller. Moreover, the first controller determines whether the selected communication path connects the host to the first controller. In response to determining that the selected communication path connects the host to the first controller, the first controller determines whether the selected communication path is the designated communication path. In response to determining that the selected communication path is not the designated communication path, the first controller sends a special status along the designated communication path, the special status indicating that the designated communication path was not chosen to satisfy the input/output request. Furthermore, information corresponding to the input/output request as well as a status is sent by the first controller along the selected communication path, the status indicating that the selected communication path was chosen to satisfy the input/output request.

In yet another general embodiment, a controller-implemented method includes: receiving an input/output request along a designated communication path. The designated communication path connects a host to the controller, while at least a second communication path also connects the host to the controller. The controller is additionally in communication with a second controller, the second controller being connected to the host by at least a third communication path and a fourth communication path. A workload associated with each of the communication paths connecting the host to a respective one of the controller and the second controller is evaluated, and one of the communication paths having a lowest workload associated therewith is selected. A determination is made as to whether the selected communication path connects the host to the controller. In response to determining that the selected communication path connects the host to the controller, another determination is made as to whether the selected communication path is the designated communication path. In response to determining that the selected communication path is not the designated communication path, a special status is sent along the designated communication path, the special status indicating that the designated communication path was not chosen to satisfy the input/output request. Moreover, information corresponding to the input/output request as well as a status is sent along the selected communication path. The status indicates that the selected communication path was chosen to satisfy the input/output request.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
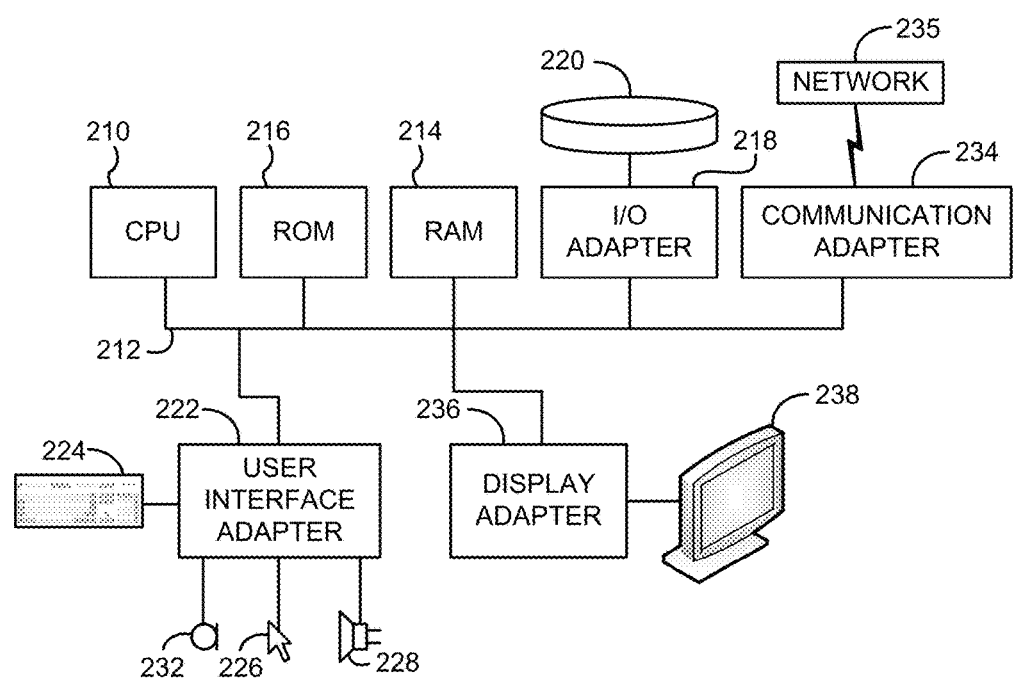
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
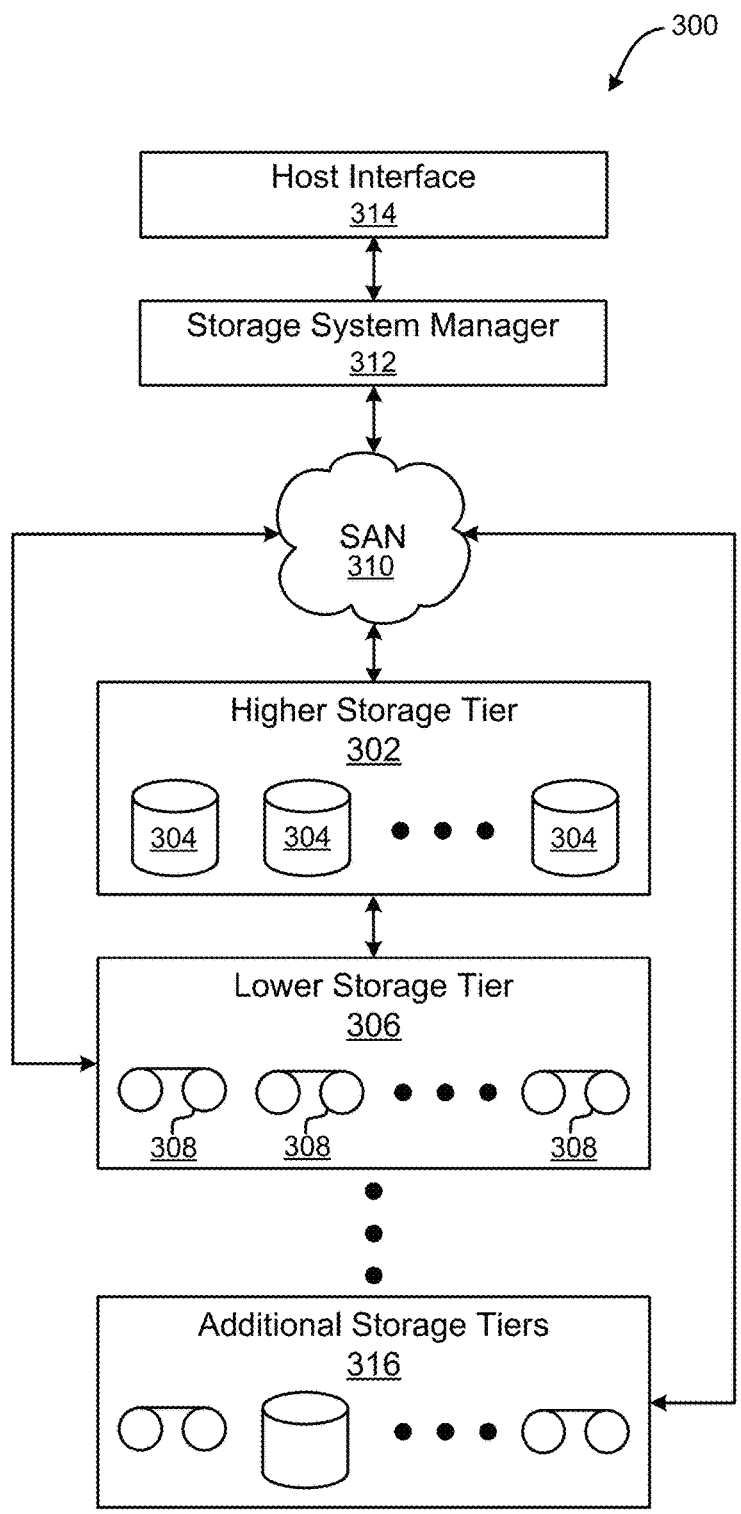
FIG. 3 is a tiered data storage system in accordance with one embodiment.

Now referring to FIG. 3, a multi-tiered storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As described above, data storage systems are used to satisfy I/O requests which correspond to a number of different hosts (e.g., users). Moreover, multipathing is a technique which defines more than one communication path between two given locations in a storage system. For instance, multipathing is used by some servers to access a single LUN, virtual disk, volume, etc., located in a given physical storage component using multiple fabric paths.

Conventional multipath implementations drive path selection from the host location. For example, when a path fails, the I/O request is reattempted using a different path selected by a multipath driver at the host location. Similarly, I/O request attempts may be sent to the storage controller of a storage system in a round robin fashion in an attempt to improve bandwidth.

However, these conventional multipath implementations experience significant problems when attempting to respond to failed I/O requests. For instance, because path selection is performed by a multipath driver at the host location, the path selection is performed without being aware of current fabric conditions and/or conditions of storage controllers in the storage system. As a result, congestions in the fabric of the storage system is not known to the host multipath driver until after an I/O request times out or I/O response times are prolonged. It follows that conventional multipath implementations are forced to guess as to which connections are best suited to accomplish a received I/O request, and are unaware of how a selected connection is performing until significant issues actually manifest themselves in the experienced performance.

In sharp contrast to the aforementioned shortcomings experienced by conventional multipath implementations, various ones of the embodiments included herein are able to select a communication path to implement based on a detailed understanding of each of the communication paths which are available. As a result, a most desirable (e.g., best suited) communication path may be selected for the given situation. Some of the embodiments included herein are thereby able to achieve improved bandwidth while also maintaining an improved fault tolerance by ensuring that the failure of one or more fabric paths does not result in a failed I/O request, e.g., as will soon become apparent.

Figure 4A:
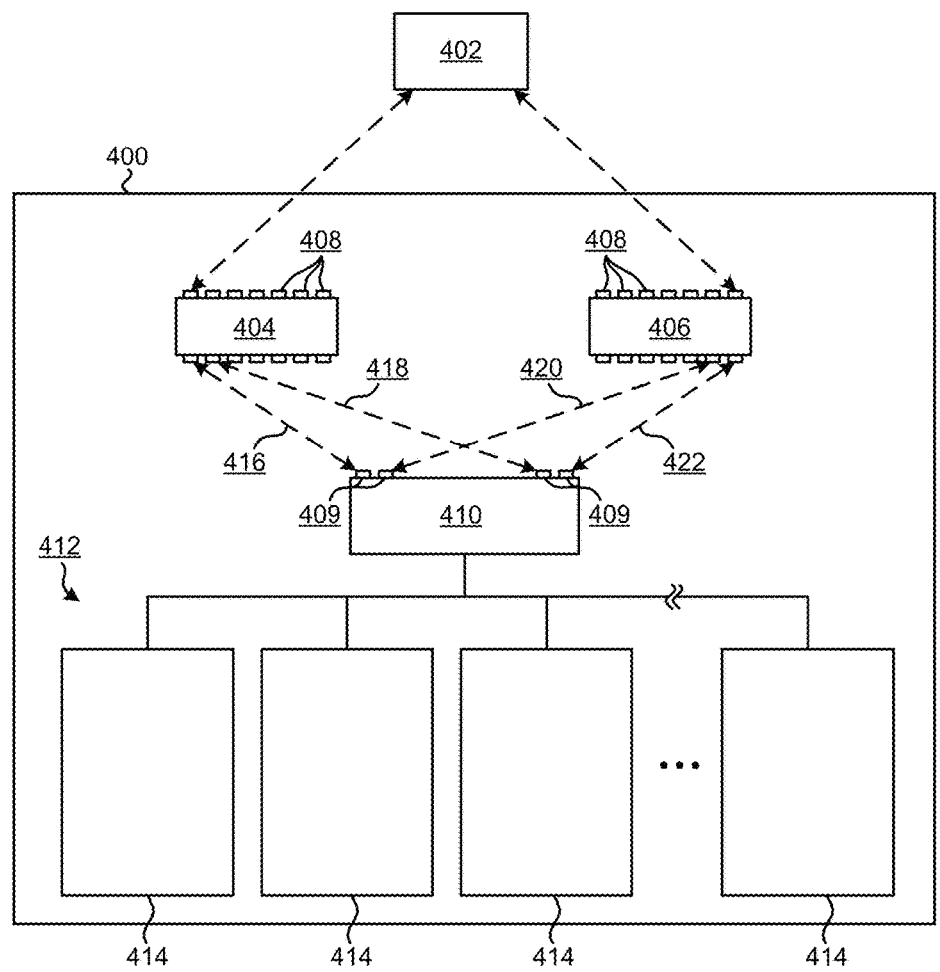
FIG. 4A is a partial representational view of a data storage system having a host coupled thereto, in accordance with one embodiment.

Looking now to FIG. 4A, a data storage system 400 is illustrated in accordance with one embodiment. As an option, the present storage system 400 may be implemented in conjunction with features from any other embodiment listed herein, such as those described with reference to the other FIGS. However, such storage system 400 and others presented herein may be used in various applications and/or in permutations which may or may not be specifically described in the illustrative embodiments listed herein. Further, the storage system 400 presented herein may be used in any desired environment. Thus FIG. 4A (and the other FIGS.) may be deemed to include any possible permutation.

As shown, the data storage system 400 is coupled to a host 402 such that the host 402 is in communication with first and second switching mechanisms 404, 406. Specifically, the host 402 is coupled to a port 408 of the first switching mechanism 404 as well as a port 408 of the second switching mechanism 406. Each of the first and second switching mechanisms 404, 406 are in turn coupled to ports 409 of a storage controller 410. It follows that information, data, requests, commands, etc. may be sent between the host 402, the first and second switching mechanisms 404, 406, and the storage controller 410.

The storage controller 410 is also coupled to a storage array 412 which includes a plurality of storage drives 414. The storage controller 410 may thereby be able to write data to and/or read data from any of the storage drives 414, e.g., in response to receiving an I/O request to do so. Depending on the approach, the storage drives 414 may include HDDs, SSDs, magnetic tape libraries, etc., and/or combinations thereof. Moreover, although only one storage array 412 is shown in the present embodiment, it should be noted that any number of different storage arrays may be implemented, e.g., as a portion of a multi-tiered storage system (e.g., see FIG. 5A below).

With continued reference to FIG. 4A, it should also be noted that the number, orientation, configuration, etc. of the various components included in the data storage system 400 are in no way intended to be limiting. Thus, although only one host is shown as being coupled to the storage system 400, any number of hosts may be coupled to the storage system 400 depending on the approach. Similarly, any number of switching mechanisms and/or storage controllers may be implemented depending on the desired approach. Each of the connections extending between the various components in FIG. 4A may also vary in type depending on the approach. For instance, any of the components in FIG. 4A may be coupled to each other using a wireless connection (e.g., WiFi, Bluetooth, a cellular network, etc.), a wired connection (e.g., a cable, a fiber-optic link, a wire, etc.), etc., or any other type of connection which would be apparent to one skilled in the art after reading the present description.

Referring still to FIG. 4A, each of the connections which extend between the switching mechanisms 404, 406 and the storage controller 410 may serve as a portion of a unique (e.g., different) communication path which ultimately connects the host 402 to the storage controller 410. In other words, each of the unique routes seen in FIG. 4A as extending between the host 402 and the storage controller 410 may provide a different communication path which may be used during a multipath implementation. For example, the connection extending between the host 402 and the first switching mechanism 404 may be paired with a first of the connections extending between the first switching mechanism 404 and the storage controller 410 to form a first communication path 416. Moreover, the connection extending between the host 402 and the first switching mechanism 404 may be paired with a second of the connections extending between the first switching mechanism 404 and the storage controller 410 to form a second communication path 418. Furthermore, the connection extending between the host 402 and the second switching mechanism 406 may be paired with a first of the connections extending between the second switching mechanism 406 and the storage controller 410 to form a third communication path 420. The connection extending between the host 402 and the second switching mechanism 406 may also be paired with a second of the connections extending between the second switching mechanism 406 and the storage controller 410 to form a fourth communication path 422.

Each of the communication paths 416, 418, 420, 422 provide a unique bridge between the host 402 and the storage controller 410. Accordingly, any one of the communication paths 416, 418, 420, 422 may be used to deliver a given I/O request, data, one or more commands, information, etc. between the host 402 and the storage controller 410, or vice versa, depending on the given approach. It follows that the first and second switching mechanisms 404, 406 are preferably able to selectively direct system traffic between the host 402 and the storage controller 410 using the communication paths 416, 418, 420, 422 which are available. Thus, depending on the approach, the first and/or second switching mechanisms 404, 406 may include buses, complex switches, bridge devices, etc.

Communication paths may be added and/or deleted from the storage system 400 as processing demands change over time. For instance, one or more communication paths may be added to storage system 400 in addition to those communication paths 416, 418, 420, 422 already depicted in an attempt to satisfy an increase in system demand. Alternatively, one or more of the communication paths 416, 418, 420, 422 depicted in FIG. 4A may be removed in response to a continued decrease in system demand. Storage system communication paths may be formed and/or removed using any management processes which would be apparent to one skilled in the art after reading the present description.

With more than one communication path being available to facilitate communication between the host 402 and the storage controller 410, the storage system 400 is able to implement multipathing. More specifically, the storage controller 410 may be used to implement multipathing. The storage controller 410 is able to determine current conditions of the system fabric which forms the different communication paths as well as stress experienced at each of the ports on the storage controller 410 itself much more quickly than host multipath drivers are able to, thereby improving the efficiency of the storage system 400 as a whole. The storage controller 410 may even be shared by multiple hosts in some approaches.

Accordingly, the storage controller 410 may select a specific one of the communication paths that is best suited for the given situation. This selection may be based on relative throughputs, processing delays, network congestion, communication loads, etc. experienced by each of the communication paths. As a result, the storage system 400 is able to ensure that I/O requests received from the host 402 are processed in a most efficient manner given the communication paths that are available.

The storage system 400 may also be able to adapt to different situations as they arise and maintain communication between the host 402 and the storage controller 410. For instance, the storage system 400 may be able to detect and/or avoid poorly performing communication paths, channel existing I/O requests from damaged communication paths to communication paths which have more desirable characteristics, etc. Thus, the storage system 400 is also able to increase the achievable amount of throughput, e.g., as will be described in further detail below.

Figure 4B:
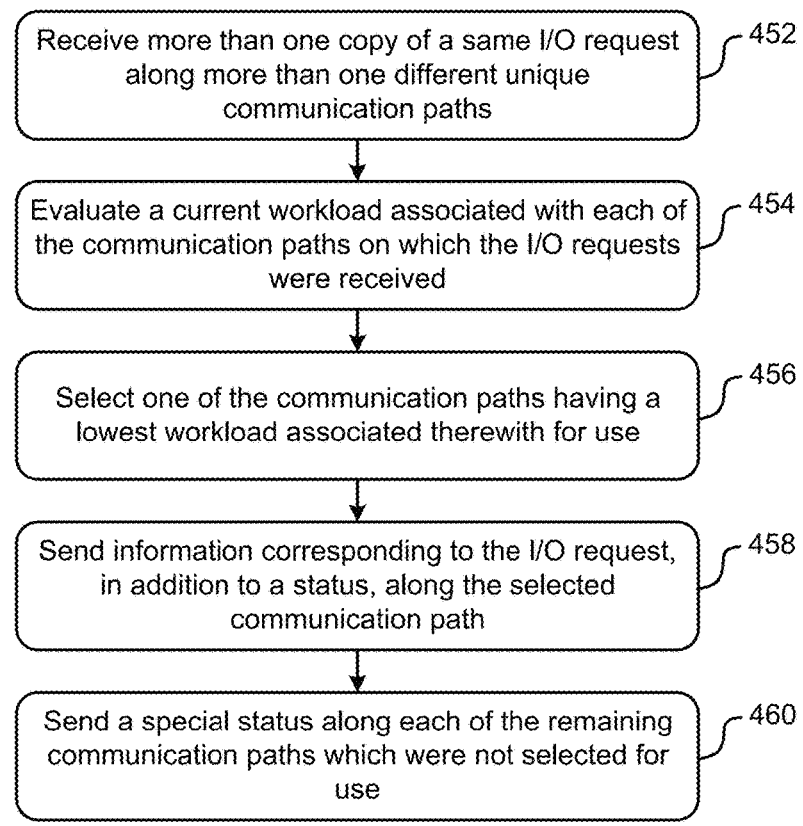
FIG. 4B is a flowchart of a method in accordance with one embodiment.

Looking to FIG. 4B, a flowchart of a controller-implemented method 450 is shown according to one embodiment. The method 450 may be performed in accordance with the present invention in any of the environments depicted in FIGS. 1-4A, among others, in various embodiments. Of course, more or less operations than those specifically described in FIG. 4B may be included in method 450, as would be understood by one of skill in the art upon reading the present descriptions.

Each of the processes in the method 450 may be performed by any suitable component of the operating environment. For example, any one or more of the processes included in method 450 may be performed by the storage controller 410 as seen in FIG. 4A. However, in various other embodiments the method 450 may be partially or entirely performed by any desired type of "controller", e.g., such as a computer, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 450. Illustrative processors include, but are not limited to, a central processing unit (CPU), an application specific integrated circuit (ASIC), a field programmable gate array (FPGA), etc., combinations thereof, or any other suitable computing device known in the art.

Embodiments which implement multipathing may send a copy of each I/O request down each of the available communication paths which connect the host to the storage controller. Accordingly, as shown in FIG. 4B, operation 452 of method 450 includes receiving more than one copy of a same I/O request (e.g., a read request, write request, etc.) along more than one different unique communication paths. As mentioned above, various ones of the processes included in method 450 may be performed by a storage controller which is implemented in a storage system (e.g., as seen in FIG. 4A). Accordingly, the more than one different unique communication paths may include each of the communication paths which connect a host (e.g., user) to a respective port of the storage controller. It should be noted that a switching mechanism may actually be positioned between the storage controller and the host, and may therefore be included as a portion of at least some of the communication paths (e.g., see 404, 406 of FIG. 4A).

Operation 454 further includes evaluating a current workload associated with each of the communication paths on which the I/O requests were received. In other words, a current status associated with each of the communication paths on which the I/O requests were received may be determined. According to some approaches the current workload associated with a given communication path may be determined by examining a corresponding port of the storage controller at which the communication path is received. In other words, the performance characteristics experienced by the storage controller at a given port which a communication path is coupled to may indicate a status of the communication path as a whole. Thus, evaluating a current workload experienced by each of the ports of the storage controller at which a copy of the I/O request was received may provide an accurate indication as to the current workload associated with each of the respective communication paths, e.g., as would be appreciated by one skilled in the art after reading the present description.

Although a current workload provides an accurate determination as to the current operational status of each of the available communication paths, other performance based information may also be desirable in some approaches. For example, computing congestion, processing timeouts, the type of physical or wireless connection(s) used to form the given communication path, user preference, etc., may be used. Accordingly, operation 454 may include evaluating additional performance based information as well.

According to some approaches, each copy of the same I/O request and/or different I/O requests altogether may also be distinguished using unique identifiers. The storage controller may thereby be able to distinguish between each of the received I/O requests and evaluate settings associated with the communication path over which the respective I/O requests were received.

Furthermore, looking to operation 456, one of the communication paths having a lowest workload associated therewith is selected for use. The communication path having a lowest workload associated therewith may cause the least amount of delay and therefore may be best suited to use while satisfying the I/O request. Thus, by selecting the communication path having a lowest workload associated therewith, operation 456 is effectively choosing to use the communication path which will result in the best performance.

Although experienced workloads provide an accurate determination as to which of the communication paths is best suited to establish a communication link between a host and the storage controller, other performance based information may be used in other approaches to make this determination. For example, computing congestion, processing timeouts, the type of physical or wireless connection(s) used to form the given communication path, user preference, etc., may be factored into the selection made in operation 456.

Moreover, this performance based information may be determined at each of ports of the storage controller. In other words, the storage controller may be able to determine the performance based information which corresponds to each of the available communication paths by analyzing operational behavior experienced at each of the respective ports of the storage controller itself. According to an illustrative approach, operation 456 may be performed by internally assessing which of the storage controller ports is currently experiencing a least amount of stress and therefore likely to respond to an I/O request with a least amount of delay. This determination may be made in some approaches by evaluating the I/O load that is experienced at each of the ports of the storage controller at any given point in time.

Referring still to method 450, operation 458 includes sending information corresponding to the I/O request, in addition to a status, along the selected communication path back to the host. In other words, the storage controller actually responds to one of the copies of the received I/O request along the selected communication path despite the fact that a different copy of the I/O request was received along each of the multiple available communication paths. It follows that the status preferably indicates to the host that the selected communication path was chosen to satisfy the given I/O request. Any type of status which would be apparent to one skilled in the art after reading the present description may be used to inform the host that the given communication path was selected to satisfy (e.g., perform) the received I/O request. For example, in some approaches the status may be sent as a small computer system interface (SCSI) message.

In some approaches the status may inform the host that additional information, follow up requests, commands, etc. which corresponds to the I/O request received in operation 452 should only be sent along the selected communication path. The status may even request that the host use the selected communication path for future I/O requests. In other words, the various processes included in method 450 may not be repeated each time the host sends information to the storage controller, e.g., in order to conserve computing resources, reduce processing delays, etc. However, in other approaches it may be desirable that the communication paths are evaluated each time the host and storage controller attempt to communicate with each other, such that the communication path which is best suited for the given situation is used. Although this may involve performing some additional processing and/or computing, the storage system as a whole is able to operate more efficiently.

The type of information sent in operation 458 may vary depending on the type of I/O request. For instance, as mentioned above, in some approaches the I/O request may be a read request. Accordingly, the information sent in operation 458 may include a copy of the data which corresponds to the read request. In other words, operation 458 may include sending a copy of the data requested to be read, thereby satisfying the read request. In other approaches the I/O request may be a write request, whereby the information sent in operation 458 may include a valid data length associated with the write request (e.g., using a R2T, XFER_RDY, etc. indication). Sending a valid data length associated with a write request may provide the information which is fundamental in actually performing the write request in memory. Thus, sending a valid data length associated with the write request may enable a host which issued the write request to actually proceed with writing the data corresponding to the write request in memory, e.g., as would be appreciated by one skilled in the art after reading the present description. Any additional information may also be sent to the host in operation 458, e.g., depending on the desired approach.

Furthermore, operation 460 includes sending a special status along each of the remaining communication paths which were not selected for use in operation 456. With reference to the present description, the "special status" preferably indicates to the host that none of the respective communication paths were chosen to satisfy the I/O request. In other words, each communication path over which a special status is received is essentially marked as not being used to perform the received I/O request. In some approaches the special status may be sent using a SCSI message which indicates that the respective communication paths were not selected to perform the I/O request. However, the special status may be sent using any other processes which would be apparent to one skilled in the art after reading the present description, e.g., such as non-volatile memory express over fabric (NVMeF).

It should be noted that although operations 458 and 460 are illustrated in FIG. 4B such that they appear to be performed in a specific order, this is in no way intended to limit the invention. Accordingly, the special statuses may be sent along each of the communication paths not selected to perform the received I/O request prior to sending the information corresponding to the I/O request and status along the selected communication path. In other words, operation 460 may be performed before operation 458 in some approaches. In other approaches operations 458 and 460 may be performed in parallel, and even simultaneously. In still other approaches, although operation 458 may be performed prior to performing operation 460, one or more of the special statuses may be received by the host prior to receiving the information and status sent in operation 458, e.g., depending on the communication paths. Accordingly, the host may implement a process which incrementally deduces which of the communication paths has been selected to perform the I/O request based on information as it is received from the storage controller, e.g., as would be appreciated by one skilled in the art after reading the present description.

According to an exemplary in-use embodiment which generally follows the flowchart of method 450 above, and which is in no way intended to limit the invention, a host is connected to a storage controller of a storage system along multiple different communication paths. The host, wishing to access data stored in the storage system, issues a copy of a read requests along each of the communication paths simultaneously to the storage controller.

In response to receiving the multiple copies of the read request, the storage controller evaluates a status of each of the communication paths. In other words, the storage controller identifies a current workload, an amount of processing congestion, an amount of delay, etc., experienced along each of the communication paths. According to some approaches, this status information may be determined by evaluating performance at each of the ports of the storage controller at which the different communication paths are received, e.g., as described in the various approaches above.

Upon determining a status of each of the communication paths, the storage controller selects a communication path over which the read request is to be satisfied. The selected communication path is preferably the communication path which is best suited to perform the received read request. In other words, the storage controller preferably determines which of the available communication paths is able to satisfy the read request in a most efficient manner, and selects it to actually perform the read request. However, in some approaches the selected communication path may have access to a cached copy of the data corresponding to the read request. Accordingly, in some approaches the selected communication path may simply offer a most efficient (e.g., quickest) way of satisfying a received I/O request.

The storage controller also preferably accesses the data which corresponds to the received read request, such that the request may be satisfied. Accordingly, the storage controller may send one or more commands to memory to actually read the data which corresponds to the read request and provide a copy of that data to the storage controller. This process of acquiring the data which corresponds to the received read request may be performed before, during (e.g., in parallel with), or after one of the communication paths has been selected to actually satisfy the read request, depending on the desired approach.

Referring still to the exemplary in-use embodiment, the storage controller sends the data corresponding to the received read request along with a status back to the host along the selected communication path. As described above, the status preferably indicates to the host that the communication path over which the status was received has been selected to actually perform the read request. Moreover, a special status is also sent along each of the remaining communication paths which were not selected to actually perform (satisfy) the read request. As mentioned above, the special status preferably indicates to the host that each of the communication paths over which a special status was received has not been selected to actually perform the read request.

Once the data which corresponds to the read request has been received, the host may use the data as desired. For example, in some approaches the data may have been requested by an application which is running at the host location. Moreover, the host may internally disregard the unanswered copies of the read request sent along the remaining communication paths which were ultimately not selected by the storage controller to satisfy the read request.

It follows that using the storage controller to determine which of the multiple available communication paths to use in order to satisfy different I/O requests significantly improves the efficiency by which the storage system is able to handle given workloads, while also increasing the achievable amount of throughput. In addition, by sending I/O requests through multiple paths, the server is able to derive improved bandwidth while performing I/O requests.

As previously mentioned, the number, orientation, configuration, etc. of the various components included in the storage system 400 of FIG. 4A are in no way intended to be limiting. In other embodiments, any number of hosts, switching mechanisms, storage controllers, etc. may be implemented depending on the desired approach. Accordingly, looking now to FIG. 5A, a data storage system 500 is illustrated in accordance with one embodiment. As an option, the present storage system 500 may be implemented in conjunction with features from any other embodiment listed herein, such as those described with reference to the other FIGS. In fact, the storage system 500 includes variations of the embodiment of FIG. 4A. Accordingly, various components of FIG. 5A have common numbering with those of FIG. 4A. However, such storage system 500 and others presented herein may be used in various applications and/or in permutations which may or may not be specifically described in the illustrative embodiments listed herein. Further, the storage system 500 presented herein may be used in any desired environment. Thus FIG. 5A (and the other FIGS.) may be deemed to include any possible permutation.

As shown, the data storage system 500 is coupled to a host 402 such that the host 402 is in communication with first and second switching mechanisms 404, 406. Specifically, the host 402 is coupled to a port 408 of the first switching mechanism 404 as well as a port 408 of the second switching mechanism 406. In the present embodiment, certain ports 408 of the first and second switching mechanisms 404, 406 are also coupled to each other, thereby forming auxiliary communication paths 514, 516. In other words, the first and second switching mechanisms 404, 406 are able to communicate directly with each other in the present embodiment using the auxiliary communication paths 514, 516 which extend therebetween. According to some approaches, one or both of the auxiliary communication paths 514, 516 may be an inter-switch link (ISL). However, one or both of the auxiliary communication paths 514, 516 may include any other type of communication link which would be apparent to one skilled in the art after reading the present description, e.g., depending on the desired approach.

The first switching mechanism 404 is in turn coupled to a first storage controller 502 while the second switching mechanism 406 is coupled to a second storage controller 504. It follows that information, data, requests, commands, etc. may be sent between any two or more of the host 402, the first and second switching mechanisms 404, 406, and the first and second storage controllers 502, 504.

The first storage controller 502 is also coupled to a first storage array 506 having a plurality of storage drives 508. Similarly, the second storage controller 504 is coupled to a second storage array 510 which also includes a plurality of storage drives 512. The first and second storage controllers 502, 504 may thereby be able to write data to and/or read data from any of the various storage drives 508, 512, e.g., in response to receiving an I/O request to do so. Depending on the approach, the storage drives 508, 512 may include HDDs, SSDs, magnetic tape libraries, etc., and/or combinations thereof. Moreover, as alluded to above, each of the first and second storage arrays 506, 510 may correspond to a different tier of a multi-tiered storage system in some approaches.

Again, each of the connections which extend between the switching mechanisms 404, 406 and the storage controllers 502, 504 may serve as a portion of a unique (e.g., different) communication path which ultimately connects the host 402 to one of the storage controllers 502, 504. In other words, each of the unique routes seen in FIG. 5A as extending between the host 402 and the storage controllers 502, 504 may provide a different communication path for a multipath implementation. Each of the communication paths 518, 520, 522, 524 have been labeled accordingly and provide a unique bridge between the host 402 and the storage controllers 502, 504. Accordingly, any one of the communication paths 518, 520, 522, 524 may be used to deliver a given I/O request, data, one or more commands, information, etc. between the host 402 and one of the storage controllers 502, 504 depending on the desired approach. It follows that the first and second switching mechanisms 404, 406 are preferably able to selectively direct system traffic between the host 402 and the storage controllers 502, 504 using the communication paths 518, 520, 522, 524, the auxiliary communication paths 514, 516, and/or combinations thereof, e.g., as will be described in further detail below.

As described above, the multiple available communication paths 518, 520, 522, 524 and auxiliary communication paths 514, 516 may be used to facilitate communication between the host 402 and the storage controllers 502, 504, and even implement multipathing. More specifically, one or both of the storage controllers 502, 504 may be used to implement multipathing. The storage controllers 502, 504 are each preferably able to determine current conditions of the system fabric which forms the different communication paths as well as stress experienced by each of the ports on the respective storage controllers 502, 504. Moreover, these determinations may be made much more quickly than host multipath drivers are able to, thereby improving the efficiency of the storage system 500 as a whole. The first and/or second storage controllers 502, 504 may even be shared by multiple hosts in some approaches.

Accordingly, each of the storage controllers 502, 504 are able to select a specific one of the communication paths that is best suited for the given situation. This selection may be based on relative throughputs, processing delays, network congestion, communication loads, etc. experienced by each of the communication paths. As a result, the storage system 500 is able to ensure that I/O requests received from the host 402 are processed in a most efficient manner given the communication paths that are available.

The storage system 500 may also be able to adapt to different situations as they arise and maintain communication between the host 402 and the storage controllers 502, 504. For instance, the storage system 500 may be able to detect and/or avoid damaged communication paths, channel existing I/O requests from poorly performing communication paths to communication paths which have more desirable characteristics, etc. Thus, the storage system 500 is also able to increase an achievable amount of throughput, e.g., as will be described in further detail below.

Figure 5A:
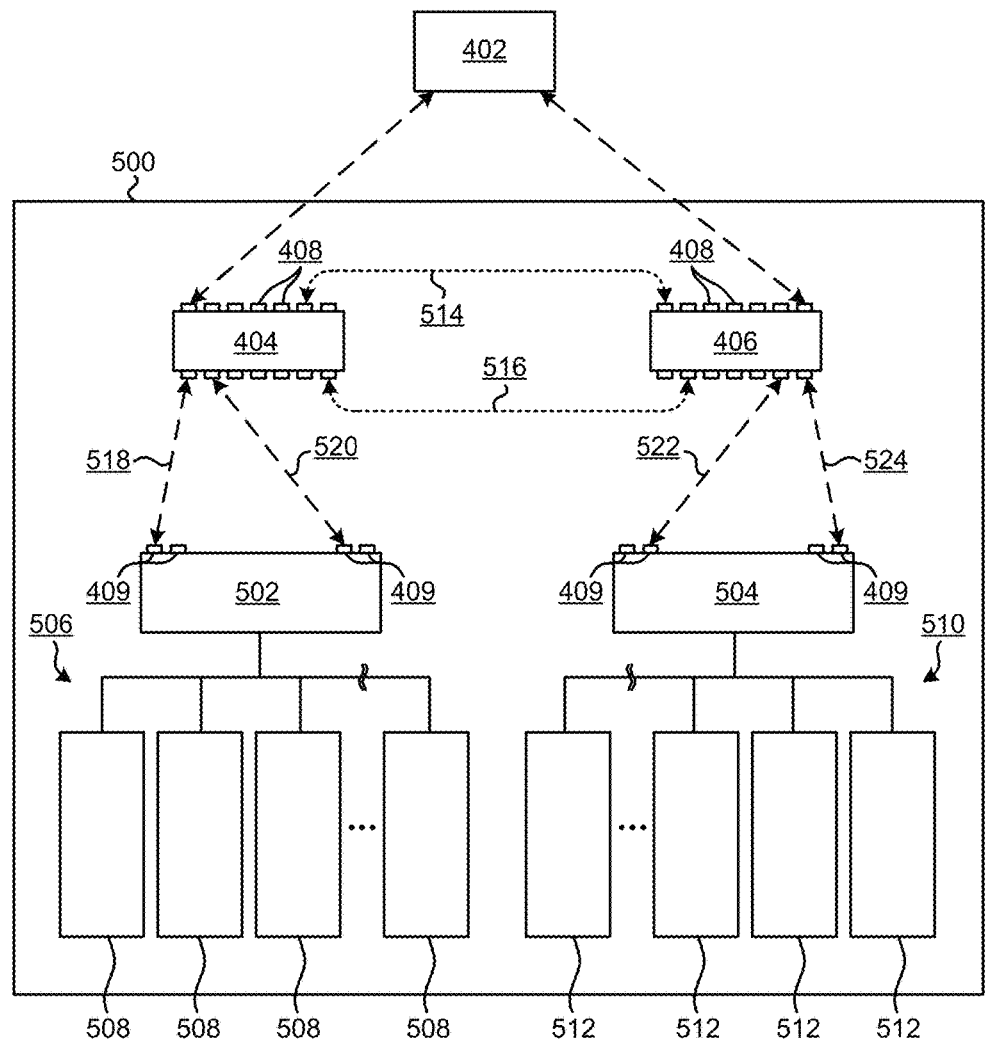
FIG. 5A is a partial representational view of a data storage system having a host coupled thereto, in accordance with one embodiment.
Figure 5B:
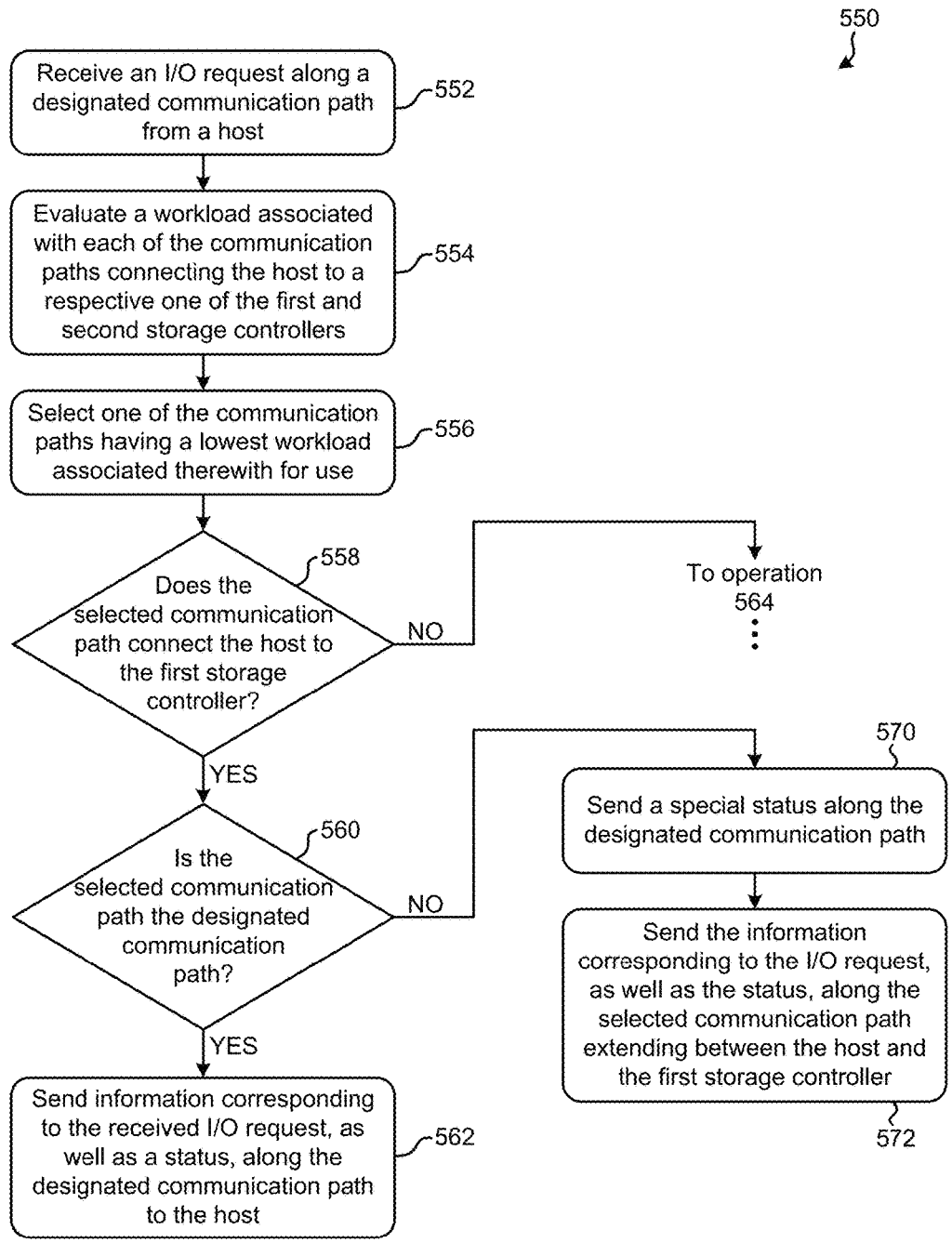
FIG. 5B is a flowchart of a method in accordance with one embodiment.
Figure 5B:
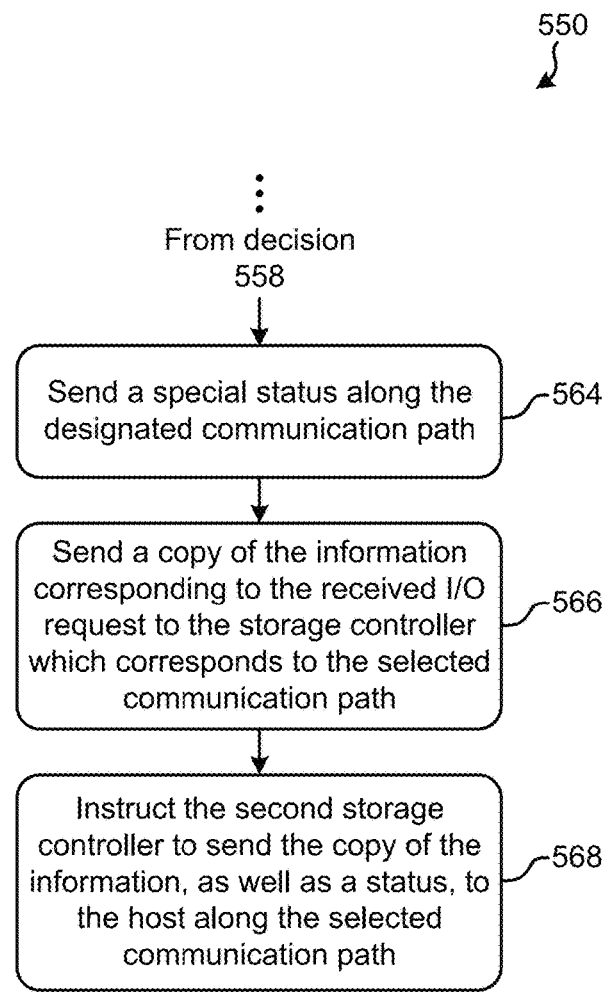

Looking to FIG. 5B, a flowchart of a controller-implemented method 550 is shown according to one embodiment. The method 550 may be performed in accordance with the present invention in any of the environments depicted in FIGS. 1-5A, among others, in various embodiments. Of course, more or less operations than those specifically described in FIG. 5B may be included in method 550, as would be understood by one of skill in the art upon reading the present descriptions.

Each of the processes in the method 550 may be performed by any suitable component of the operating environment. For example, any one or more of the processes included in method 550 may be performed by one of the storage controllers 502, 504 as seen in FIG. 5A. However, in various other embodiments the method 550 may be partially or entirely performed by any desired type of "controller", e.g., such as a computer, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 550. Illustrative processors include, but are not limited to, a central processing unit (CPU), an application specific integrated circuit (ASIC), a field programmable gate array (FPGA), etc., combinations thereof, or any other suitable computing device known in the art.

Although some embodiments which implement multipathing send a copy of each I/O request down each of the available communication paths which connect a host to a storage controller, other embodiments may only send a single copy of an I/O request along a single communication path. For instance, in some approaches one of the communication paths which connects the host to a port of one of the storage controllers may be designated as a default communication path which is used to deliver I/O requests to the storage controller. This may be accomplished as a result of modifying protocol mappings to include I/O request identifiers on the data and status frames which are received. Accordingly, as shown in FIG. 5B, operation 552 of method 550 includes receiving an I/O request (e.g., such as a read request, a write request, etc.) along a designated communication path.

Although only a single copy of the I/O request is received by a storage controller from a host along the designated communication path, additional communication paths may exist between the host, the storage controller and/or other storage controllers (e.g., see FIG. 5A above). Moreover, embodiments which implement more than one storage controller may cluster the storage controllers together. In other words, two or more storage controllers may share some sort of interconnected relationship. According to an example, which is in no way intended to limit the invention, first and second storage controllers 502, 504 in FIG. 5A are indirectly connected to each other through the auxiliary communication paths 514, 516 which extend between the first and second switching mechanisms 404, 406. Storage controllers which are clustered together may thereby be able to send information, commands, requests, data, etc., to each other.

Referring again to method 550, operation 554 includes evaluating a workload associated with each of the communication paths connecting the host to a respective one of the first and second storage controllers. Again, although only one copy of an I/O request may be received from a host along a designated communication path, a number of other communication paths may exist between the host and the storage controllers in a storage system.

As described above, evaluating a workload associated with a communication path may include examining a corresponding port of the respective storage controller at which the communication path is received. In other words, the performance characteristics experienced by the storage controller at a given port which a communication path is coupled to may indicate a status of the communication path as a whole. Thus, evaluating a current workload experienced by each of the ports of the storage controllers which are coupled to a communication path may provide an accurate indication as to the current workload associated with each of the respective communication paths, e.g., as would be appreciated by one skilled in the art after reading the present description.

Furthermore, looking to operation 556, one of the communication paths having a lowest workload associated therewith is selected for use. As described above, although experienced workloads provide an accurate determination as to which of the communication paths is best suited to establish a communication link between a host and the storage controllers, other performance based information may be used in other approaches to make this determination. For example, computing congestion, processing timeouts, the type of physical or wireless connection(s) used to form the given communication path, user preference, etc., may be factored into the selection made in operation 556.

Moreover, this performance based information may be determined at each of the ports of the storage controllers. In other words, the storage controller which received the I/O request (i.e., the "receiving storage controller" which may also be referred to in method 550 as the "first storage controller") may be able to determine the performance based information which corresponds to each of the available communication paths by analyzing operational behavior experienced at each of the respective ports of the storage controllers themselves. According to an illustrative approach, the receiving storage controller may perform operation 556 by internally assessing which of the ports is currently experiencing a least amount of stress. Moreover, the receiving storage controller may send requests to other storage controllers which may be clustered thereto, the requests prompting the other storage controllers to respond with performance based information corresponding to each of their respective ports.

It follows that the selection in operation 556 may be made in some approaches by evaluating the performance based information which corresponds to each of the ports of clustered storage controllers at any given point in time. As such, the communication path which is ultimately selected in operation 556 may extend between the host and a different storage controller than the storage controller which received the I/O request in operation 552. Accordingly, decision 558 includes determining whether the communication path selected in operation 556 connects the host to the receiving storage controller. In other words, decision 558 includes determining whether the communication path selected to perform the I/O request is one of the communication paths which extend between the host and the controller which initially received the I/O request.

Method 550 proceeds to decision 560 in response to determining that the communication path selected to perform the I/O request is one of the communication paths which extend between the host and the controller which initially received the I/O request. There, decision 560 further includes determining whether the selected communication path is the designated communication path. In other words, decision 560 includes determining whether the communication path selected to perform the I/O request is the same designated communication path over which the I/O request was initially received.

In response to determining that the selected communication path is the designated communication path, method 550 proceeds to operation 562, which includes sending information corresponding to the received I/O request, as well as a status, along the designated communication path to the host. In other words, the receiving storage controller actually responds to the received I/O request along the same communication path it was received over despite the fact that multiple other communication paths may be available. It follows that the status preferably indicates to the host that the designated communication path was chosen to satisfy the received I/O request. Any type of status which would be apparent to one skilled in the art after reading the present description may be used to inform the host that the designated communication path was selected to satisfy (e.g., perform) the received I/O request. Accordingly, any of the approaches described above with respect to method 450 may be implemented.

Referring still to operation 562 of method 550, the type of information sent may vary depending on the type of I/O request which was received. For instance, as mentioned above, in some approaches the I/O request may be a read request. Accordingly, the information sent in operation 562 may include a copy of the data which corresponds to the read request. In other words, operation 562 may include sending a copy of the data requested to be read, thereby satisfying the read request. In other approaches the I/O request may be a write request, whereby the information sent in operation 562 may include a valid data length associated with the write request (e.g., using a R2T, XFER_RDY, etc. indication), e.g., as described in various approaches above. Any additional information may also be sent to the host in operation 562, e.g., depending on the desired approach.

Because a single copy of the I/O request is received and satisfied using the same designated communication path in response to performing operation 562, the receiving storage controller may not inform the host that the other communication paths were not selected for implementation. However, a special status may be sent to the host in approaches where a communication path other than the designated communication path is selected, e.g., as will soon become apparent.

Returning to decision 558, method 550 proceeds to operation 564 in response to determining that the communication path selected to perform the I/O request is not one of the communication paths which extend between the host and the controller which initially received the I/O request. In other words, method 550 proceeds to operation 564 in response to determining that a communication path which connects the host to a different storage controller has been selected to satisfy the I/O request. There, operation 564 includes sending a special status along the designated communication path. As described above, the special status preferably indicates to the host that the communication path over which the I/O request was received has not been chosen to satisfy the I/O request. Accordingly, because the I/O request may only be sent over the designated communication path in some embodiments, a special status may only be sent over the designated communication path. However, in other approaches two or more copies of the I/O request may have been received over two or more respective communication paths, in which case a special status may be sent to the host over each of the two or more communication paths (e.g., see operation 460 of FIG. 4B above).

From operation 564, method proceeds to operation 566 which includes sending a copy of the information corresponding to the I/O request to the storage controller which corresponds to the communication path selected in operation 556. As previously mentioned, two or more storage controllers may be clustered together in some approaches. Accordingly, the two or more clustered storage controllers may be able to communication with each other. In some approaches, clustered storage controllers may be able to communicate with each other directly. In other words, the clustered storage controllers may be able to send information, commands, requests, data, etc., directly between each other using a wired and/or wireless connection which extends therebetween. It follows that the copy of the information sent in operation 566 may be sent directly from the receiving storage controller (e.g., without using any intermediary components) to the second storage controller which corresponds to the selected communication path.

In other approaches, clustered storage controllers may communicate with each other through one or more intermediary components, e.g., such as one or more switching mechanisms. In other words, the clustered storage controllers may be able to send information, commands, requests, data, etc., between each other using one or more intermediary components. For example, referring momentarily back to FIG. 5A, the first storage controller 502 may communicate with the second storage controller 504 through the first and second switching mechanisms 404, 406 and the auxiliary communication paths 514, 516 which extend therebetween. It follows that the copy of the information sent in operation 566 of method 550 may be sent to the storage controller which corresponds to the selected communication path using one or more intermediary components.

With continued reference to FIG. 5B, operation 568 includes instructing the second storage controller (the storage controller which corresponds to the communication path selected in operation 556) to send the copy of the information, as well as a status, to the host along the selected communication path. According to some approaches, operation 568 may include sending one or more instructions to the storage controller which corresponds to the communication path selected in operation 556, the one or more instructions instructing the receiving storage controller to send the copy of the information and the status to the host. The one or more instructions may also specify to do so using the communication path selected in operation 556.

Upon receiving the instructions sent in operation 568, the storage controller which corresponds to the communication path selected in operation 556 may send the copy of the information and the status to the host, e.g., according to any of the approaches described herein. As a result, the I/O request received in operation 552 is successfully satisfied in a most efficient manner possible given the available communication paths.

Returning now to decision 560, method 550 proceeds to operation 570 in response to determining that the selected communication path is not the designated communication path. In other words, method 550 proceeds to operation 570 in response to determining that the communication path selected in operation 556 is one of the communication paths other than the designated communication path which connect the host to the receiving storage controller. There, operation 570 includes sending a special status along the designated communication path. As described above, the special status preferably indicates to the host that the communication path over which the I/O request was received has not been chosen to actually satisfy (e.g., return information corresponding to) the I/O request. Accordingly, because the I/O request may only be sent over the designated communication path in some embodiments, a special status may only be sent over the designated communication path.

Moreover, operation 572 includes sending the information corresponding to the I/O request, as well as the status, along the selected communication path extending between the host and the receiving storage controller. Again, the status preferably indicates to the host that the selected communication path was chosen to satisfy the I/O request.

It should again be noted that although various ones of the operations are illustrated in FIG. 5B such that they appear to be performed in a specific order, this is in no way intended to limit the invention. Accordingly, any of the approaches described above with respect to the order in which the status and special status are sent may be implemented depending on the desired approach.

According to another exemplary in-use embodiment which generally follows the flowchart of method 550 above, and which is in no way intended to limit the invention, a host is connected to two storage controllers located in a storage system along multiple different communication paths. However, one of the communication paths has been identified as a designated communication path which is to be used by the host to deliver I/O requests to a first of the storage controllers. The host, wishing to store data in memory, issues a write requests along the designated communication path to the first storage controller.

In response to receiving the write request, the storage controller evaluates a status of each of the multiple different communication paths extending between the host and the first and second storage controllers. In other words, the first storage controller identifies a current workload, an amount of processing congestion, an amount of delay, etc., experienced along each of multiple different communication paths. According to some approaches, this status information may be determined by evaluating performance at each of the ports of the first storage controller at which at least some of the multiple different communication paths are received, e.g., as described in the various approaches above. Moreover, the first storage controller may send one or more instructions to the second storage controller to evaluating performance at each of the ports of the second storage controller at which at least some of the multiple different communication paths are received. The second storage controller may also send a result of the evaluated performance back to the first storage controller.

Upon determining a status of each of the communication paths which are available, the storage controller selects a communication path over which the write request is to be satisfied (e.g., performed). The selected communication path is preferably the communication path which is best suited to perform the received write request. In other words, the first storage controller preferably determines which of the available communication paths is able to satisfy the write request in a most efficient manner, and selects it to actually perform the write request.

According to the present exemplary in-use embodiment, the first storage controller selects one of the communication paths which connects the host to the second storage controller to satisfy the write request. A special status is thereby sent along the designated communication path which was not selected to actually perform (satisfy) the write request. As mentioned above, the special status preferably indicates to the host that the designated communication path has not been selected to actually perform the write request. According to some approaches, the special status may include a data length of zero, thereby preventing the host from initiating the write request along the designated communication path, e.g., as would be appreciated by one skilled in the art after reading the present description.

Information corresponding to the write request is sent from the first storage controller to the second storage controller. Depending on the approach, cache replication, offloaded data transfer (ODX), XCopy, etc., or any other available mechanisms may be implemented by the first storage controller in order to send the information corresponding to the write request to the second storage controller.

The first storage controller also instructs the second storage controller to send the copy of the information corresponding to the write request, along with a status, to the host using the selected communication path. As described above, the status preferably indicates that the communication path over which the status was received by the host has been selected to actually perform the write request. Accordingly, the second storage controller may send the copy of the information corresponding to the write request, along with a status, to the host as instructed to do.

After the information which corresponds to the write request has been received, the host may use the information to actually perform the write request. The write request is preferably performed by continuing to use the selected communication path. For example, the information corresponding to the write request may include an actual data length of the write request, thereby allowing the host to perform the write request, e.g., as would be appreciated by one skilled in the art after reading the present description. The host may thereby send the data which is to be stored in memory to the second storage controller using the selected communication path. Moreover, the host may internally disregard the copy of the write request originally sent along the designated communication path.

Although subsequent I/O requests may be sent over the selected communication path, the host may also return to sending new I/O requests over the designated communication path, such that the status of the available communication paths may be reevaluated in the interest of maintaining system efficiency.

It follows that various ones of the embodiments included herein are able to improve application performance by intelligently selecting communication paths which are best suited for the given task at hand, particularly in situations which involve system and/or network congestion. These improvements to application performance are further exemplified in comparison to conventional products which are forced to guess as to which connections are best suited to accomplish a given I/O request. Various embodiments described herein are also able to maintain efficient performance even when faced with storage controller port congestion and/or switching mechanism level congestion scenarios, as a storage controller is able to detect and compensate for such conditions significantly faster than conventionally achievable. This is due, at least in part, to the fact that storage controllers are exposed to I/O requests which are received from multiple hosts through multiple different ports.

Further still, some of the embodiments included herein are also able to improve storage controller performance, as processing loads may be distributed between clustered storage controllers as described herein, e.g., to counteract port congestion, processing delays, network timeouts, etc. This may also desirably reduce the number of application timeouts experienced at the host locations.

Although significant improvements may be achieved as a result of implementing the various embodiments included herein, in some situations these techniques may not be implemented for every I/O request that is issued by a host. For instance, any of the approaches included herein may be implemented periodically in order to determine a preferred communication path for a given LUN from a storage controller's perspective. Moreover, this preferred communication path may be utilized in order to perform I/O requests which are issued for a given window of time before various ones of the approaches included herein are reapplied in order to determine whether a different communication path has become more desirable to use, e.g., depending on updated system performance, network traffic, I/O request type, LUN involved, etc. However, in other situations various ones of the embodiments included herein may be performed for each I/O request received. Accordingly, a different and distinct communication path may potentially be used to perform each subsequently received I/O request.

Moreover, it should be noted that any of the approaches included herein may be implemented in a storage system which is applied in a cloud environment. Accordingly, communication paths may be created and/or removed from the storage system in more of a random nature which may ultimately allow for the system to address fluctuating demands in a more fluid and effective manner, e.g., as would be appreciated by one skilled in the art after reading the present description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product comprising a computer readable storage medium having program instructions embodied therewith, wherein the computer readable storage medium is not a transitory signal per se, the program instructions readable and/or executable by a controller to cause the controller to perform a method comprising:
   receiving, by the controller, a same input/output request along more than one different communication paths, wherein each of the communication paths connect a host to the controller;
   evaluating, by the controller, a workload associated with each of the communication paths;
   selecting, by the controller, one of the communication paths having a lowest workload associated therewith;
   sending, by the controller, information corresponding to the input/output request as well as a status along the selected communication path, wherein the status indicates that the selected communication path was chosen to satisfy the input/output request; and
   sending, by the controller, a special status along each remaining communication path, wherein the special status indicates that none of the remaining communication paths were chosen to satisfy the input/output request.

2. The computer program product of claim 1, wherein the input/output request is a read request, wherein sending the information corresponding to the input/output request includes sending a copy of data corresponding to the read request.

3. The computer program product of claim 1, wherein the input/output request is a write request, wherein sending the information corresponding to the input/output request includes sending a valid data length associated with the write request.

4. The computer program product of claim 1, wherein one or more switching mechanisms are positioned between the controller and the host, wherein each of the more than one different communication paths extend between the controller and a respective one of the one or more switching mechanisms.

5. A computer program product comprising a computer readable storage medium having program instructions embodied therewith, wherein the computer readable storage medium is not a transitory signal per se, the program instructions readable and/or executable by a first controller to cause the first controller to perform a method comprising:
   receiving, by the first controller, an input/output request along a designated communication path, wherein the designated communication path connects a host to the first controller, wherein at least a second communication path connects the host to the first controller, wherein the first controller is in communication with a second controller, the second controller being connected to the host by at least a third communication path and a fourth communication path;
   evaluating, by the first controller, a workload associated with each of the communication paths connecting the host to a respective one of the first and second controllers;
   selecting, by the first controller, one of the communication paths having a lowest workload associated therewith;
   determining, by the first controller, whether the selected communication path connects the host to the first controller;
   determining, by the first controller, whether the selected communication path is the designated communication path in response to determining that the selected communication path connects the host to the first controller;
   sending, by the first controller, a special status along the designated communication path in response to determining that the selected communication path is not the designated communication path, the special status indicating that the designated communication path was not chosen to satisfy the input/output request; and
   sending, by the first controller, information corresponding to the input/output request as well as a status along the selected communication path, wherein the status indicates that the selected communication path was chosen to satisfy the input/output request.

6. The computer program product of claim 5, the program instructions readable and/or executable by the first controller to cause the first controller to perform the method comprising:
   sending, by the first controller, a special status along the designated communication path in response to determining that the selected communication path does not connect the host to the first controller, the special status indicating that the designated communication path was not chosen to satisfy the input/output request; and
   sending, by the first controller, a copy of the information corresponding to the input/output request to the second controller; and
   sending, by the first controller, one or more instructions to the second controller, the one or more instructions instructing the second controller to send the copy of the information to the host along the selected communication path.

7. The computer program product of claim 6, wherein the first and second controllers are configured to communicate with each other through one or more switching mechanisms, wherein the copy of the information corresponding to the input/output request is sent to the second controller through the one or more switching mechanisms.

8. The computer program product of claim 6, wherein the first and second controllers are configured to communicate with each other directly, wherein the copy of the information corresponding to the input/output request is sent directly to the second controller.

9. The computer program product of claim 5, wherein the input/output request is a read request, wherein sending the information corresponding to the input/output request includes sending a copy of data corresponding to the read request.

10. The computer program product of claim 5, wherein the input/output request is a write request, wherein sending the information corresponding to the input/output request includes sending a valid data length associated with the write request.

11. The computer program product of claim 5, the program instructions readable and/or executable by the first controller to cause the first controller to perform the method comprising:

sending, by the first controller, information corresponding to the input/output request as well as the status along the designated communication path in response to determining that the selected communication path is the designated communication path.

12. The computer program product of claim 5, wherein a first switching mechanism is positioned between the host and the first controller, wherein the designated communication path and the at least a second communication path extend between the first controller and the first switching mechanism, wherein a second switching mechanism is positioned between the host and the second controller, wherein the at least a third and fourth communication paths extend between the second controller and the second switching mechanism.

13. A controller-implemented method, comprising:
receiving an input/output request along a designated communication path, wherein the designated communication path connects a host to the controller, wherein at least a second communication path connects the host to the controller, wherein the controller is in communication with a second controller, the second controller being connected to the host by at least a third communication path and a fourth communication path;
evaluating a workload associated with each of the communication paths connecting the host to a respective one of the controller and the second controller;
selecting one of the communication paths having a lowest workload associated therewith;
determining whether the selected communication path connects the host to the controller;
determining whether the selected communication path is the designated communication path in response to determining that the selected communication path connects the host to the controller;
sending a special status along the designated communication path in response to determining that the selected communication path is not the designated communication path, the special status indicating that the designated communication path was not chosen to satisfy the input/output request; and
sending information corresponding to the input/output request as well as a status along the selected communication path, wherein the status indicates that the selected communication path was chosen to satisfy the input/output request.

14. The controller-implemented method of claim 13, comprising:
sending a special status along the designated communication path in response to determining that the selected communication path does not connect the host to the controller, the special status indicating that the designated communication path was not chosen to satisfy the input/output request; and
sending a copy of the information corresponding to the input/output request to the second controller; and
sending one or more instructions to the second controller, the one or more instructions instructing the second controller to send the copy of the information to the host along the selected communication path.

15. The controller-implemented method of claim 14, wherein the controller and the second controller are configured to communicate with each other through one or more switching mechanisms, wherein the copy of the information corresponding to the input/output request is sent to the second controller through the one or more switching mechanisms.

16. The controller-implemented method of claim 14, wherein the controller and the second controller are configured to communicate with each other directly, wherein the copy of the information corresponding to the input/output request is sent directly to the second controller.

17. The controller-implemented method of claim 13, wherein the input/output request is a read request, wherein sending the information corresponding to the input/output request includes sending a copy of data corresponding to the read request.

18. The controller-implemented method of claim 13, wherein the input/output request is a write request, wherein sending the information corresponding to the input/output request includes sending a valid data length associated with the write request.

19. The controller-implemented method of claim 13, comprising:
sending information corresponding to the input/output request as well as the status along the designated communication path in response to determining that the selected communication path is the designated communication path.

20. The controller-implemented method of claim 13, wherein a first switching mechanism is positioned between the host and the controller, wherein the designated communication path and the at least a second communication path extend between the controller and the first switching mechanism, wherein a second switching mechanism is positioned between the host and the second controller, wherein the at least a third and fourth communication paths extend between the second controller and the second switching mechanism.

* * * * *